May 22, 1962 R. SPARKS 3,035,815
BOARD PULLER
Filed Aug. 2, 1960 2 Sheets-Sheet 1
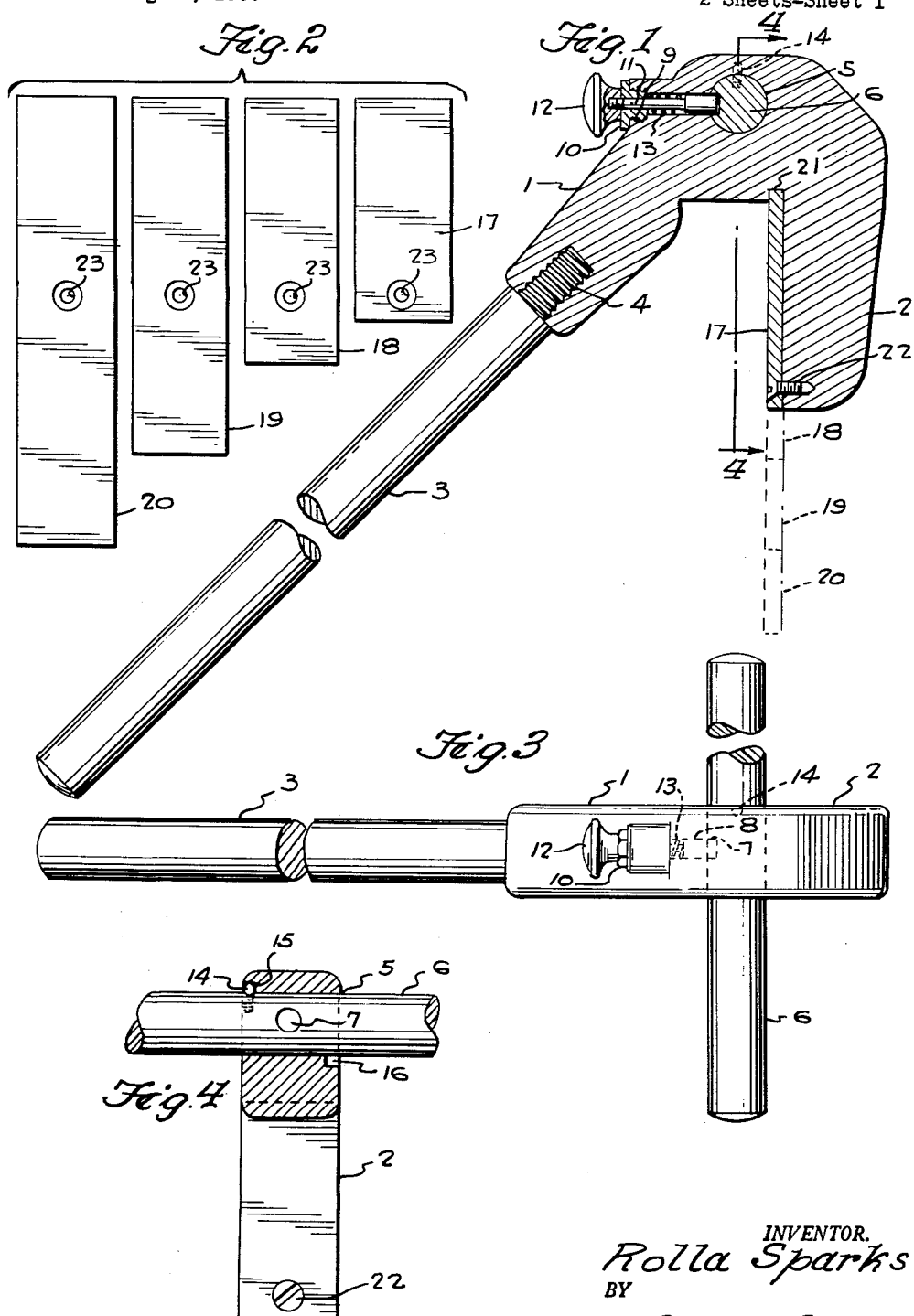
INVENTOR.
Rolla Sparks
BY
McMorrow, Berman & Davidson
ATTORNEYS

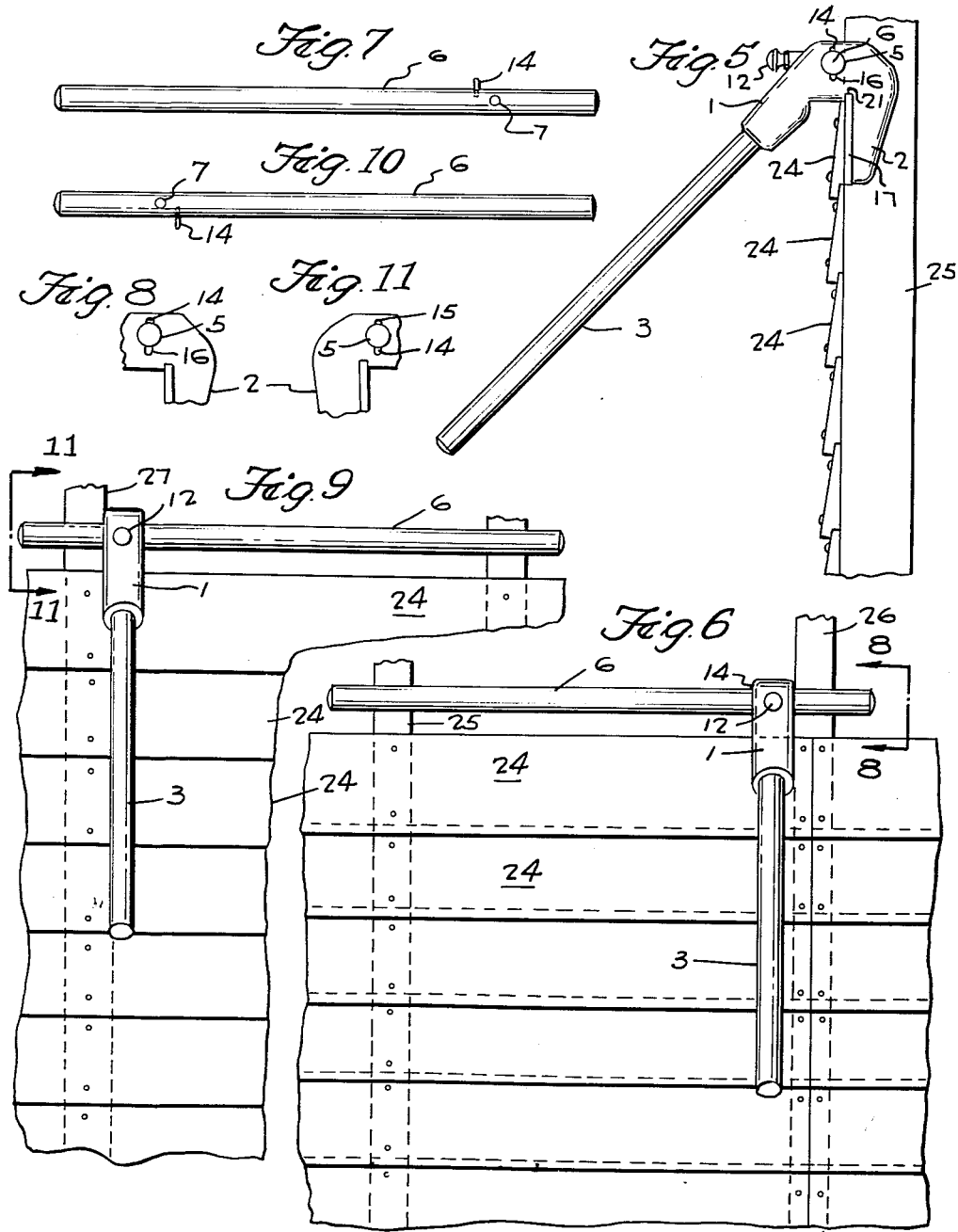

United States Patent Office 3,035,815
Patented May 22, 1962

3,035,815
BOARD PULLER
Rolla Sparks, 801 Moore St., Nashville, Ill.
Filed Aug. 2, 1960, Ser. No. 47,080
7 Claims. (Cl. 254—129)

This invention relates to a tool for dismantling wooden structures, the tool being of a type generally related, in basic mechanical principles, to the simple wrecking bar. The latter, which is nothing more than a special-purpose crowbar, has its uses where salvage is not a prime consideration in the wrecking process, since it involves highly concentrated stresses and consequent piecemeal destruction of the material being removed. In addition, being effective over only a small area at a time, it must be applied with undue frequency with consequent loss of time and waste of effort.

It is therefore an object of the invention to provide a tool for dismantling structures which will operate without destruction of the parts removed or any damage which would impair their utility in re-use. A further object is to accomplish the foregoing object without sacrifice of mechanical advantage residing in the lever principle. Other and related objects are to provide a tool of the stated nature which is particularly adapted to use on conventional, framed structures, which is adapted to right or left hand use and to employment in tight corners and which is rapid in use, light in weight, low in cost and easily transportable.

These and other objects which will be readily apparent to those skilled in the art are accomplished by the present invention which may be briefly described as a working head of hook form having a replaceable pressure plate on the contact arm and an extending handle on the other arm and adapted to be fixed at selected positions along a transverse rod which serves as a fulcrum.

For a more detailed description of the invention reference is made to the following specification, as illustrated in the drawings, in which:

FIGURE 1 is a side elevational view of a preferred embodiment of the tool, with the working head shown in section along a central line thereof, FIGURE 2 is a bracketed grouping of a series of alternate pressure plates, shown in plan view, FIGURE 3 is a top plan view of the tool of FIGURE 1, FIGURE 4 is a sectional view taken along the line 4—4 of FIGURE 1, FIGURE 5 is a view similar to FIGURE 1, reduced in scale, showing the application of the tool to siding elements of a framed building structure, FIGURE 6 is a front elevation of FIGURE 5, as seen from the left of that figure.

FIGURE 7 is a detail showing, separately, the fulcrum bar in the position it occupies in FIGURE 6, FIGURE 8 is a fragmentary view showing details as seen along the line 8—8 of FIGURE 6, FIGURE 9 is a view similar to that of FIGURE 6, showing the working head of the tool in an alternative mounting on the fulcrum rod, FIGURE 10 is a view similar to FIGURE 7, showing separately, the fulcrum bar in the position it occupies in FIGURE 9, and FIGURE 11 is a view similar to FIGURE 8, showing details as seen along the line 11—11 of FIGURE 9.

Referring to the drawings by characters of reference, there is shown a tool comprising a working head of generally V-form with angularly disposed arms 1 and 2 constituting, respectively, the input and output sections of a lever of the first class. For proper mechanical advantage the input section 1 is equipped with a handle 3 of suitable length having a reduced, threaded end 4 by which it is secured in a threaded bore in the outer face of section 1. The region of the head at the apex of the V is somewhat greater in thickness than the arms to compensate for a bore 5 in which is slidably received a fulcrum rod or roller 6 which is preferably of a length sufficient to overlap a pair of studs in a conventionally framed structure.

For most efficient use, the tool head should be as close as possible to a stud, and therefore the tool is constructed in a manner to locate the head near an end of the fulcrum rod 6. Thus, near one end the rod 6 has a bore 7 adapted to receive a retractable, spring-urged keying pin 8 mounted in the tool head as follows: A bore 9 in the head receives the pin 8 in a sliding fit and the bore is threaded at its outer end to receive a bushing 10 having a central bore receiving a reduced shank 11 of pin 8. A knob 12 is threadedly attached to the outer end of shank 11, and a coil spring 13 surrounding the shank and under compression by the bushing 10 biases the pin 8 inwardly into position in the bore 7 of rod 6.

For ready location of the head at locking position on the rod a cooperating pin and slot arrangement is provided. This feature, which is best seen in FIGURE 4, comprises a radially protruding pin 14 threaded in the rod adapted to alternatively receive one of a pair of niches 15, 16, located, respectively, in opposite faces of the head, and in diametrically opposite positions in the bore 5.

Mounting is accomplished by inserting the end of the bar nearest bore 7 through the bore 5 of the head until the inner side of the head contacts the pin 14, the rod being rotated, if necessary, until pin 14 is received in the niche which happens to be on the inner face of the head. Since rod 6 may be inserted from either the right side or the left side of the head, the two adjusted positions of the head shown in FIGURES 6 and 9 are readily obtainable. The relation of bore 7, pin 14 and niches 15 or 16 is such that when the pin is received in a niche the lock pin 8 is in proper position to slip into the bore 7. Removal of the head is simply effected by pulling out knob 12 to release the locking pin.

To adapt the tool to a variety of widths of siding the tool is provided with interchangeable pressure plates 17, 18, 19, 20 (FIG. 2) of varying length. FIGURE 1 shows the shortest plate 17 in place on the head, with its inner end received in a slot 21 in the head and its outer end secured by a screw 22, for which latter function each plate is provided with a counterbored opening 23. The mounted positions of the several alternative plates is indicated in FIGURE 1 in phantom lines.

The operation of the tool will be clear from FIGURES 5 and 6 showing the operation of removing a series of clapboards 24 from their nailed mounting on studs such as 25, 26. With the pressure arm 2 dropped behind the top clapboard and rod 6 overlapping the pair of studs 25, 26, an upward force exerted on handle 3, as indicated by the arrow in FIGURE 5, brings the pressure plate 17 into contact wtih the top clapboard. With the studs now resisting any inward movement of the bar 6 the latter begins to act as a fulcrum and the resultant pressure of the plate 17 on the siding causes separation of the latter from stud 26 without splintering, and with possibly some separation from stud 25. The tool is then moved to the leftward to span the next stud interval and separation of the board from stud 25 is effected, and so on. When the extreme left end is reached it may be found convenient to quickly reverse the position of the tool head on bar 6, as shown in FIGURE 9, to get near a stud such as 27. With the head thus adjusted, the work may proceed from left to right on the next lower row until the end corner is reached.

In order to secure lightness without undue sacrifice of strength, the head, handle and roller will preferably be fabricated of high strength aluminum. The detachable pressure plates however, since they extend beyond the head in some cases and therefore lack backing will preferably be of steel, of the order of ⅜ inch of thickness.

It will be seen that the tool described herein is highly efficient, and adaptable and saving of material. It is also light in weight, low in cost, and readily separable into small units for ready packaging and portability.

While a certain preferred embodiment has been shown and described, the invention should not be deemed as limited thereby, but only as shall appear from the spirit and scope of the appended claims.

I claim:

1. A salvage tool comprising a head with component arms arranged at an acute angle, a handle attached to one of said arms, said head having a bore intermediate said arms arranged in a direction transverse to said handle, a roller bar slidably received in said bore and having an order of length sufficient to span one interval of conventional upright studding, a spring-pressed pin slidably received in said head and movable into said bore, a knob for withdrawing said pin from said bore located outwardly of said head, said bar having a recess located at a position between its center and one end and sized to receive said pin, said head having a pair of niches in opposite faces and opening into said bore at diametrically disposed points, a fixed pin protruding radially from said bar and located in a manner to position said spring-pressed pin for entry in said recess when said fixed pin is received in either of said niches, and a replaceable pressure plate on the other of said arms, with its inner end received in a slot in said head and secured to said head at point outwardly of said slot.

2. A salvage tool comprising a head with component arms arranged at an acute angle, a handle attached to one of said arms, said head having a bore intermediate said arms arranged in a direction transverse to said handle, a roller bar slidably received in said bore and having an order of length sufficient to span one interval of conventional, upright studding, a spring-pressed pin slidably received in said head and movable into said bore, a knob for withdrawing said pin from said bore located outwardly of said head, said bar having a recess located at a position between its center and one end and sized to receive said pin, said head having a pair of niches in opposite faces and opening into said bore at diametrically disposed points, a fixed pin protruding radially from said bar and located to position said spring-pressed pin for entry in said recess when said fixed pin is received in either of said niches, and a pressure plate detachably secured to the inner face of the other of said arms.

3. A salvage tool comprising a head with component arms arranged at an acute angle, a handle attached to one of said arms, said head having a bore intermediate said arms arranged in a direction transverse to said handle, a roller bar slidably received in said bore and having an order of length sufficient to span one interval of conventional, upright studding, a spring-pressed pin slidably received in said head and movable into said bore, a knob for withdrawing said pin from said bore located outwardly of said head, said bar having a recess located apart from its center of length to receive said pin, said head having a pair of niches in opposite faces and opening into said bore at diametrically disposed points, and a fixed pin protruding radially from said bar and located to position said spring-pressed pin for entry in said recess when said fixed pin is received in either of said niches.

4. A salvage tool comprising a head with component arms arranged at an acute angle, a handle attached to one of said arms, said head having a bore intermediate said arms arranged in a direction transverse to said handle, a fulcrum bar slidably received in said bore and having a length of an order sufficient to span one interval of conventional, upright studding, a latch in said head movable into said bore, said bar having a recess located apart from its center of length to receive said latch, said head having a pair of niches in opposite faces and opening into said bore at diametrically opposite positions, and a fixed pin protruding radially from said bar and located to position said latch for entry in said recess when said fixed pin is received in either of said niches.

5. A salvage tool comprising a head with diverging arms of unequal length, said head having a bore intermediate said arms in a direction transverse to said arms, a fulcrum bar slidably received in said bore and having a length sufficient to span one interval of conventional upright studding, a latch in said head movable into said bore, said bar having a recess located apart from its center of length to receive said latch, said head having a pair of niches in opposite faces and opening into said bore at diametrically opposite positions, and a fixed pin protruding from said bar and located to position said latch for entry in said recess when said fixed pin is received in either of said niches.

6. A salvage tool comprising a head with diverging arms of unequal length, said head having a bore intermediate said arms in a direction transverse to said arms, a fulcrum bar slidably received in said bore and of a length sufficient to span one interval of conventional upright studding, a latch in said head movable into said bore, said bar having a recess located apart from its center of length to receive said latch, said head having a niche in one face opening into said bore, and a fixed pin protruding from said bar and located to position said latch for entry in said recess when said fixed pin is received in said niche.

7. A salvage tool comprising a head wtih diverging arms of unequal length, means adapted to be secured to one of said arms for varying the length thereof, said means including a plurality of pressure plates of different lengths which are adapted to be selectively secured to said one of said arms, the head having a bore intermediate said arms in a direction transverse to said arms, a fulcrum bar slidably received in said bore, a latch in said head movable into said bore, said bar having means therein located apart from its center of length to receive said latch, said head having a niche in one face opening into said bore, and a fixed pin protruding from said bar and located to position said latch for entry in said last named means when said fixed pin is received in said niche.

References Cited in the file of this patent

UNITED STATES PATENTS

| | | |
|---|---|---|
| 1,389,820 | Downey | Sept. 6, 1921 |
| 1,401,935 | Ahlby | Dec. 27, 1921 |
| 2,189,480 | Tessier | Feb. 6, 1940 |
| 2,910,271 | Keehn | Oct. 27, 1959 |
| 2,929,609 | Graef | Mar. 22, 1960 |